June 17, 1941.  E. G. SIMPSON  2,245,832
SLIDING TOP
Filed Nov. 1, 1938  4 Sheets-Sheet 3

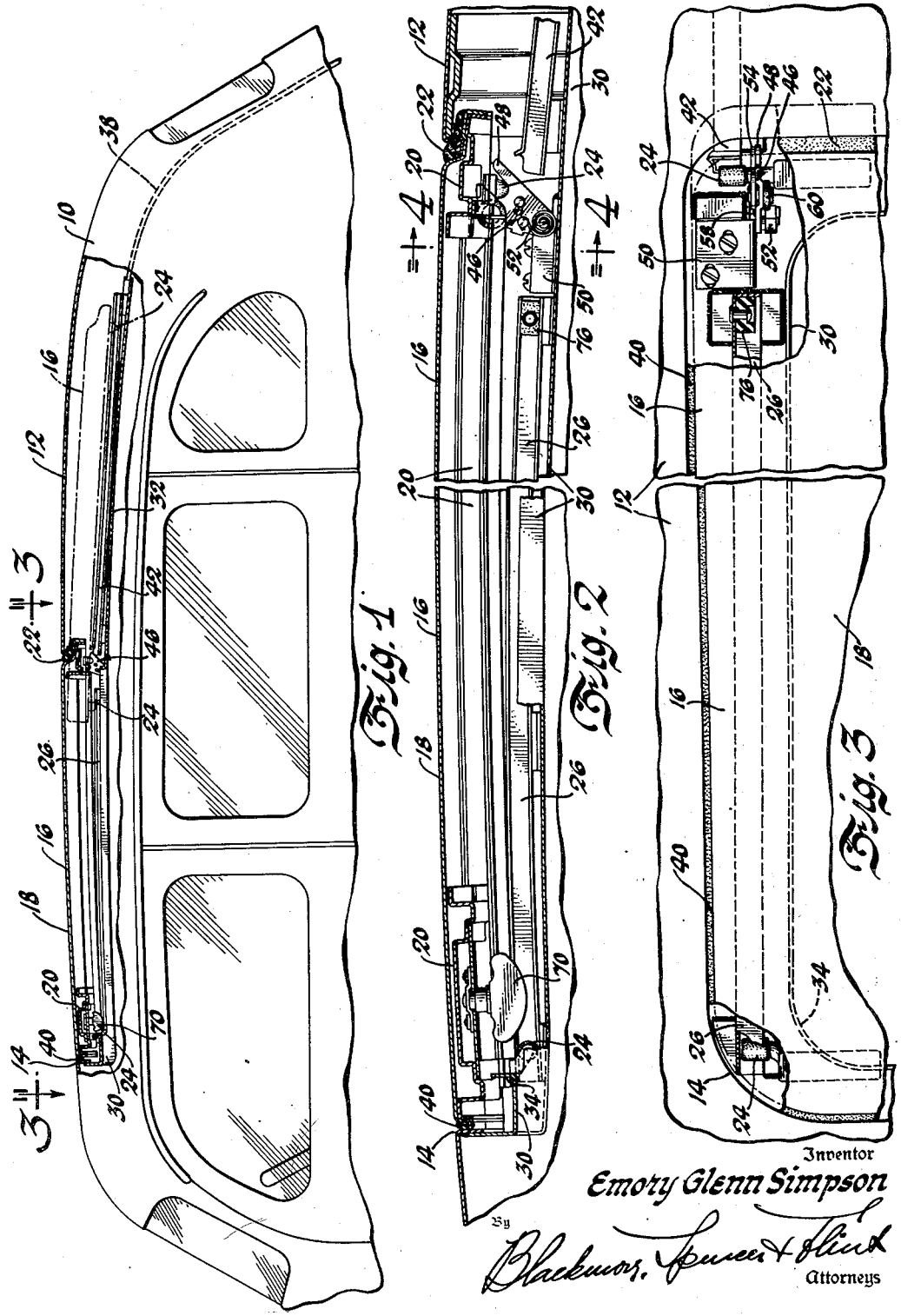

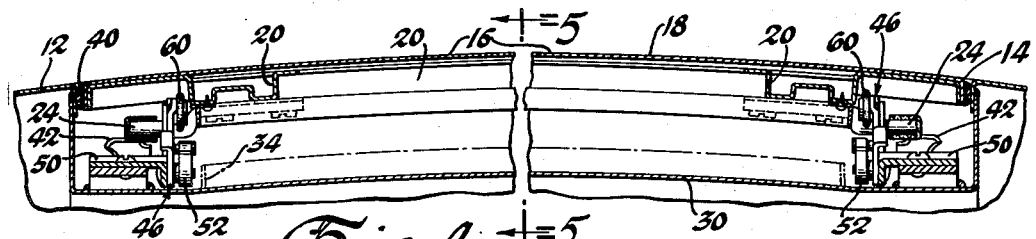
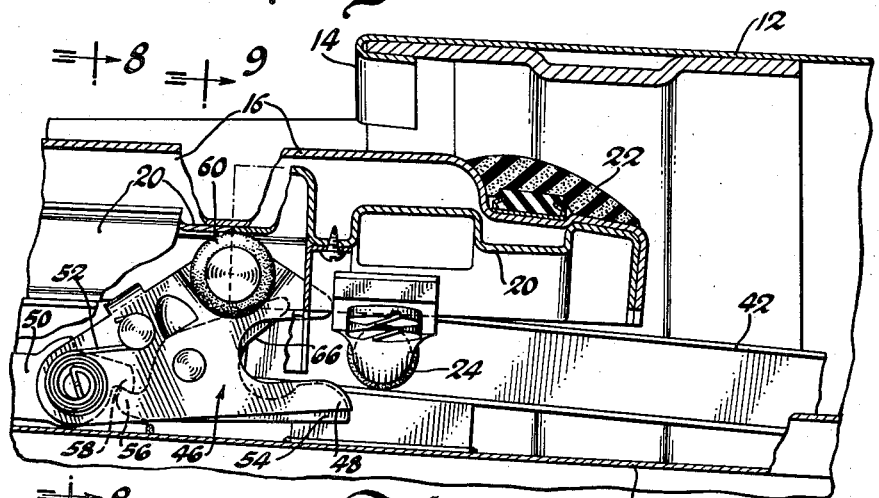
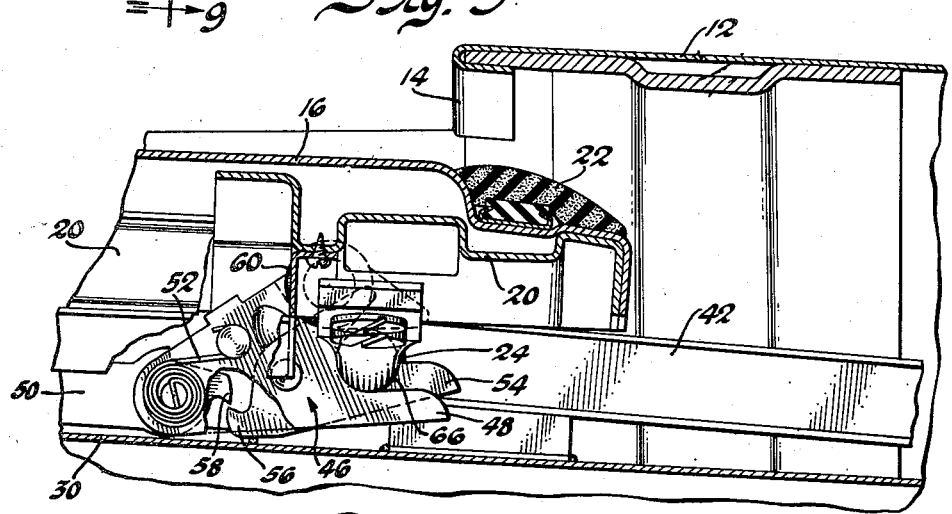

Inventor
Emory Glenn Simpson
By Blackmore, Spencer & Hink
Attorneys

June 17, 1941.  E. G. SIMPSON  2,245,832
SLIDING TOP
Filed Nov. 1, 1938  4 Sheets-Sheet 4

Inventor
Emory Glenn Simpson
By
Blackmun, Spencer & Hirt
Attorneys

Patented June 17, 1941

2,245,832

UNITED STATES PATENT OFFICE 2,245,832

SLIDING TOP

Emory Glenn Simpson, Detroit, Mich., assignor to Ternstedt Manufacturing Company, Detroit, Mich., a corporation of Michigan Application November 1, 1938, Serial No. 238,236

11 Claims. (Cl. 296—137)

This invention has to do with a so-called "sunshine top" for automobiles of the type in which the roof is provided with an opening in the forward part and a roof panel is provided to close the opening, this panel being slidably mounted on suitable tracks so that when not in use it may be slid beneath the rear fixed section of the top.

In such constructions it is desired that when the sliding panel is in closed position it shall be flush with the remainder of the roof. In the case of the forward edge of the panel this is readily accomplished by sliding the panel into place, but this necessarily leaves the rear portion of the panel below the level of the fixed portion of the roof.

An important feature of the present invention consists in the provision of pivoted extensions of the rear tracks, which, when the sliding panel is pulled forwardly to nearly closing position, receive trunnions mounted on the rear end of the sliding panel and, upon continued forward movement of the panel, guide the rear portion in a circular path forwardly and upwardly into sealing engagement with the opening in the roof. Suitable means is provided for locking the panel in this position and this locking means is preferably so designed that rotation of the handle toward locking position operates through mechanical advantage to give the desired forward movement to the sliding panel.

The invention involves other features and arrangements of parts hereinafter described which add to the convenience, ease of operation and appearance of the construction.

In the drawings:

Figure 1 is a side elevation of the upper portion of an automobile body having most of the roof portion in section and showing the sliding panel in full lines in its forward closed position and in dotted lines in its retracted position.

Figure 2 is an enlarged section showing the sliding panel in closed position.

Figure 3 is a fragmentary top plan view with parts broken away showing the sliding panel in closed position.

Figure 4 is a section on line 4—4 of Figure 2.

Figure 5 is an enlarged fragmentary sectional view showing a pivoted track extension and co-operating parts just before the final closing movement of the panel, on the line 5—5 of Figure 4.

Figure 6 is a similar view of a later step in the closing movement, and

Figure 7:
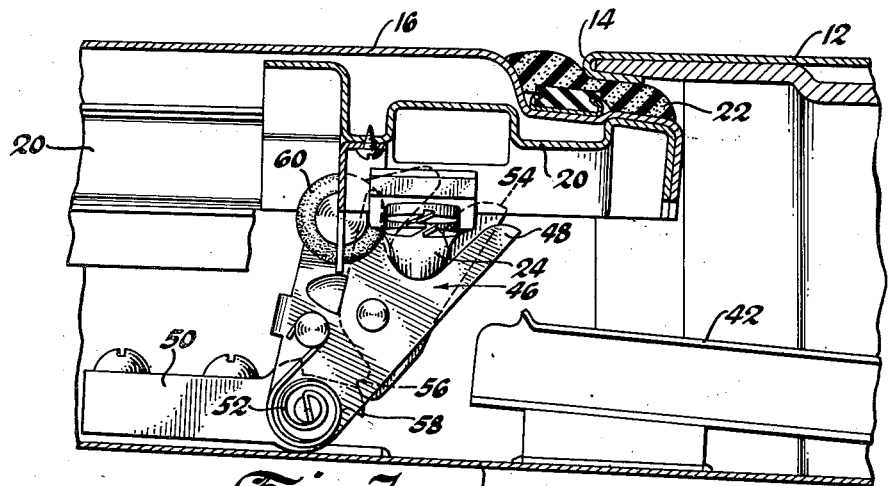
Figure 7 is a similar view with the panel in completely closed position.

10 indicates the upper portion of a conventional automobile preferably of all metal construction although the invention is equally applicable to other types of bodies. 12 indicates the fixed portion of the roof having an opening 14 which may be closed by sliding panel 16 or may be left open with the sliding panel 16 in the dotted line position indicated in Figure 1.

The panel 16 is preferably of rigid construction consisting of sheet metal stamping 18 having flanged edges and reinforced along all four edges by frame members 20 which serve both to stiffen it and to provide a mounting for parts hereinafter described.

At its rear edge panel 16 is provided with a suitable yieldable gasket 22 which may take the form of sponge rubber, felt or a rubber strip secured as shown. This strip as is clearly indicated in Figures 2 and 7 makes weather-tight engagement with the rear edge of the opening 14.

At each of the four corners of the sliding panel there is secured to the transverse frame members 20, a laterally projecting trunnion 24 preferably covered with felt or other sound deadening material. The forward trunnions 24 ride in longitudinally extending U-shaped tracks 26, best shown in Figures 2 and 3, which are mounted in the bottom of an annular trough 30 surrounding the opening 14 as best shown in Figures 1, 2 and 3. This trough has a rearward enlargement or extension 32 shown in Figure 1, which underlies and covers the panel 16 when in retracted position. The edges of the trough 30 are upturned as at 34, best shown in these figures, so that any water which may pass through the joint between the sliding panel and the remainder of the roof is caught in it and conducted by tube 38, shown at the right of Figure 1, to a point beneath the car.

The sealing between the panel 16 and the remainder of the roof is completed by means of sealing strip 40 secured to the outer side of the downturned flange at the front and sides of the panel. The strip 40 may consist of cloth, rubber, rubberized fabric or any other materials commonly used for such purposes in automobile body construction.

Figure 10:
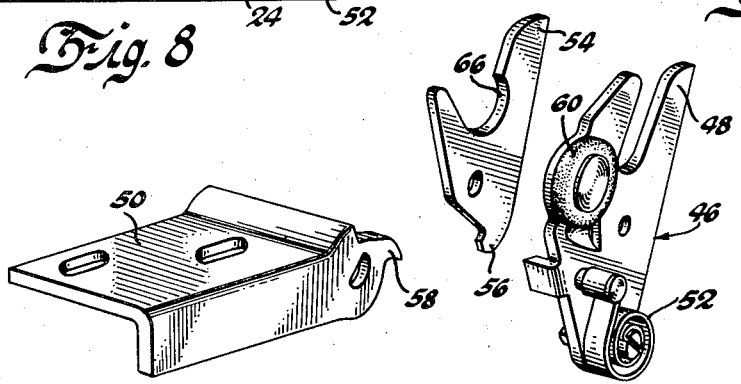
Figure 10 is an exploded view in perspective of the pivoted track extension assembly.

The trunnions 24 secured to the rear corners of the sliding panel travel in tracks 42 suitably supported in trough extension 32 beneath the fixed rear portion of the roof, except when the panel approaches the forward limit of its travel. Then the trunnions are received in pivoted track extension mechanism 46, shown in detail in Figure 10. The operation of this mechanism is made evident by a comparison of Figures 5, 6 and 7. The mechanism consists of track extension member 48 pivoted to member 50 which is adjustably secured to a suitable bracket fastened to the bottom of the trough 30. Torsion spring 52 normally urges the track extension member 48 in upward or counterclockwise direction as shown in Figures 5, 6 and 7. This spring may be of whatever strength may be desired to hold the parts against rattling and to give some assistance in the elevation of the sliding panel to closed position. I have preferred to employ a relatively weak spring. In order to hold the trunnions 24 in the mouth or fork of the pivoted track extension 48, as shown in Figure 7, there is pivoted to the track extension 48 a dog 54 having at one end a camming nose 56 adapted to be engaged with a cam surface on a locking lug 58 formed on the member 50, and at the other end a forked extension having a seat 66 adapted to receive the trunnion on the rear of the sliding panel. The operation of this structure will be later described. On the upper portion of the pivoted track extension 48 there is journaled a roller 60 preferably covered with felt or other sound deadening material. The top 16 rests and rolls on this roller when moved to its open or closed position and the weight of the top holds the track extension in down position (Figures 5 and 6).

The track extension mechanism operates as follows. When the panel is in retracted position the track extension mechanism occupies the position shown in Figure 5 so that the extension member 48 is alined with the track and is in position to receive one of the rear trunnions 24. As the panel is moved forwardly from the position shown in Figure 5 to that shown in Figure 6 the trunnion 24 engages portion 66 (Figure 5) of the dog 54 which extends into the trunnion receiving opening in the track extension member. This engagement rocks the dog 54 thereby causing the seat portion 66 of the dog to engage around the trunnion 24 and further movement of the track extension 48 on its pivot will cause the nose 58 to engage the camming surface of the lug 28 and thereby hold the trunnion in engagement with the track extension member. This locking action is positive for as soon as the parts 56 and 58 are separated (Figure 6) and the counterclockwise movement of the track extension is started, the outer or cam face of the dog 56 rides on the outer or cam face of lug 58 as shown in Figure 7 and the engagement of these two surfaces positively prevents movement of the dog 54 to position to release the trunnion 24 from locking engagement in the track extension. It will be understood that the turning action of the torsion spring 52 is assisted by the continued forward movement of the sliding panel to locked position.

There is indicated at 70, in Figures 1 and 2, a handle connected to suitable mechanism such as that shown in the patent issued to James H. Wernig and Gustav Chutorash, No. 2,201,330, issued May 21, 1940, so that upon rotation of the handle when the panel is approaching closing position, a suitable latch engages a lug on the panel 16, and, upon continued rotation, the panel is drawn forwardly and finally locked in closed position by toggle action. This mechanism is not specifically illustrated in the present case because it forms the subject matter of the said copending application. It functions to make it easier to draw the panel forwardly by giving the operator the benefit of mechanical advantage through a suitable arrangement of levers. At the end of its rotation the handle effects locking of the parts in closed position by toggle action. However, if desired, a simple handle could be provided with which to pull the sliding section forwardly and any suitable latching means or spring pressed detent could be employed to releasably hold the panel in forward position.

It will be understood that when it is desired to retract the sliding panel it is simply necessary to rotate the handle 70 thereby releasing the latching mechanism and to then slide the panel rearwardly. Since, as shown in Figure 7, the rear trunnion 24 is locked to the pivoted track extension 48 by the dog 54, the rear portion of the panel will move in an arc about the pivot of the track extension. This movement continues until the parts reach the position shown in Figure 6 in which the nose 56 of the dog 54 clears the point of the locking lug 58. Further rearward movement of the panel 16 now effects rocking of the dog 54 thereby causing the nose 56 of the dog 54 to interlock as shown in Figure 5 so as to hold the pivoted track extension in alinement with the track 42 and at the same time releasing the trunnion 24 so that it may be slid rearwardly beneath the fixed portion of the roof.

Figures 8, 9:
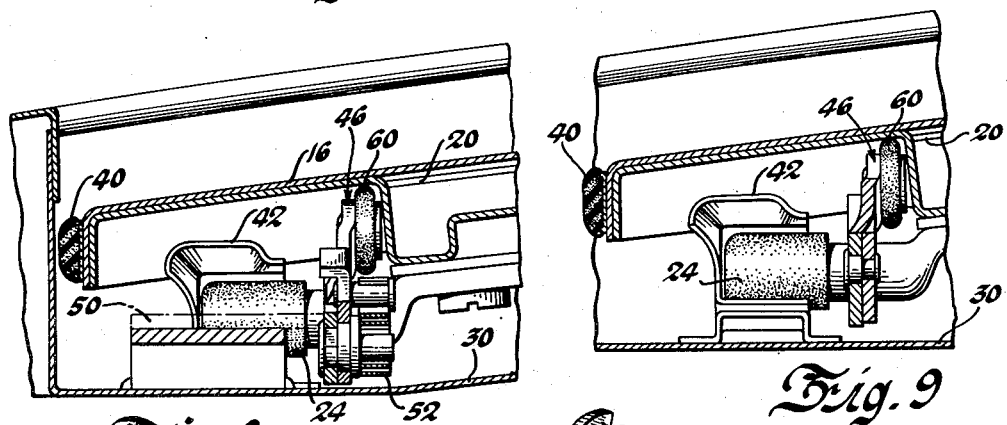
Figures 8 and 9 are sections on the correspondingly numbered section lines of Figure 5.

It is desirable to apply some spring pressure to the sliding roof section when in retracted or partially retracted position so as to prevent it from rattling in its guides. This is accomplished by roller 60 carried by track extension member 48 engaging the under side of panel 16 as shown in Figures 8 and 9, as the panel 16 is moved rearwardly thereby rotating the track extension mechanism in a clockwise direction beyond the position of engagement of nose 56 with lug 58 and holding it in such position so that the torsion spring 52 is free to urge the track extension member 48 and the roller 60 carried thereby upwardly against the roof section causing the trunnions 24 to be pressed against the upper flanges of the tracks 26 and 42 and so preventing rattling.

The rearward movement of the panel 16 is limited by suitable means such as rubber bumpers 76 mounted in the rear ends of the forward track sections 26.

Figure 11:
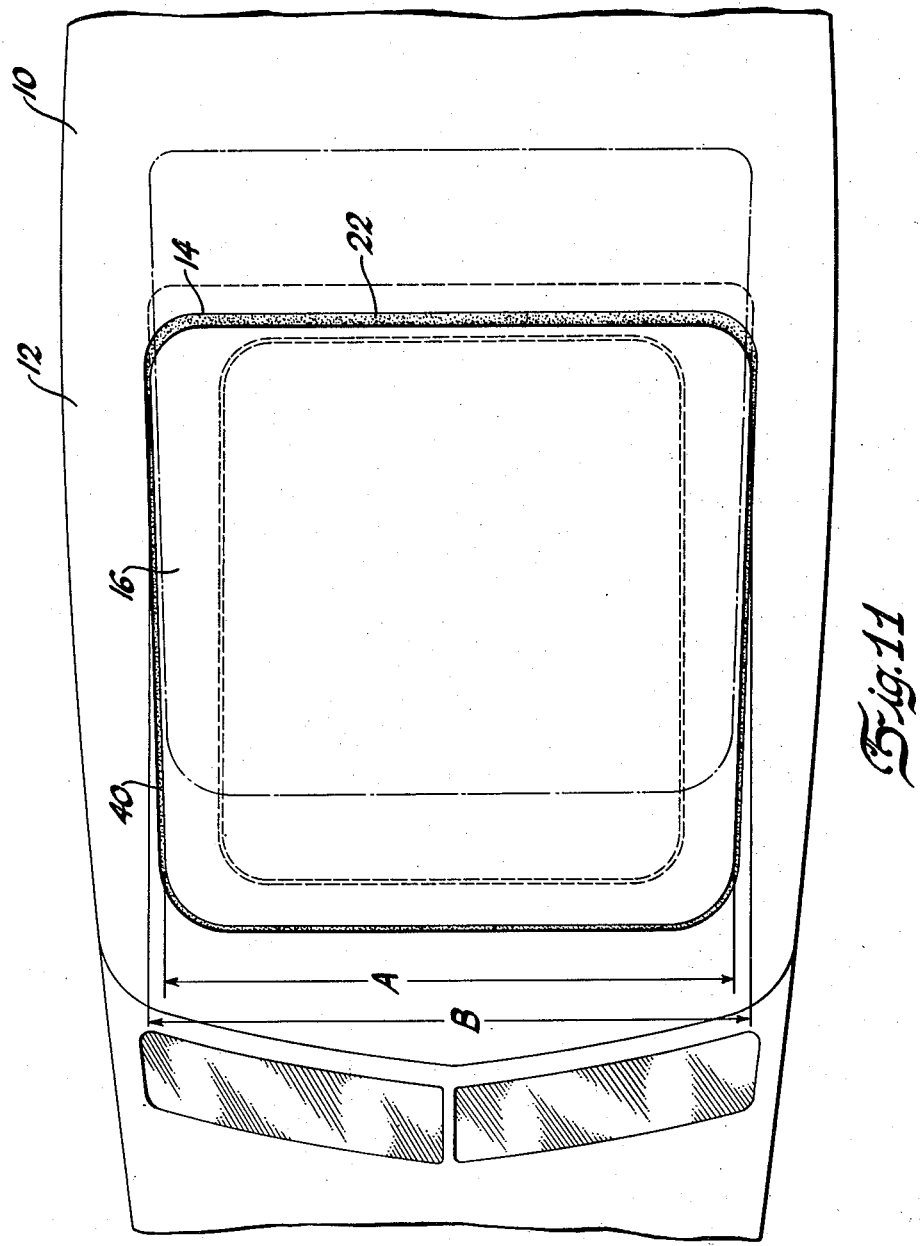
Figure 11 is a plan view of the vehicle illustrating the wedge-shaped opening and wedge-shaped sliding top.

In order to insure a tight fit of the sliding panel in the opening in the roof I found it preferable to make both the opening and the panel of tapered shape in plan as indicated in Figures 3 and 11 with the small end of the taper at the forward end of the roof. With this design the final forward movement of the panel wedges it into engagement with the roof opening. In Figure 11 the wedge-shaped sliding top and wedge-shaped opening are shown. The letter A indicates the narrower part of the wedge and the letter B the wider part.

To install the sliding top, the track extension 48 and dog 54 are moved upwardly by hand until the engaging surfaces of 56 and 58 are out of engagement. The trunnions may now be set in the forks of the dog 54 and track extension 48 because the dog is free to move relative to the track extension when the surfaces of parts 56 and 58 are out of engagement. As the sliding top is dropped into place, the surfaces will move over each other and the parts assume the position of Figure 5.

I claim:

1. In a top for automobiles, a combination of a roof having an opening therein, a panel for closing the opening, means for slidably guiding the panel for movement into and out of closing position, said means including tracks secured to the body and projections on the panel engaging the tracks, and pivoted projection receiving members at the forward ends of the tracks alined with the tracks when the panel is in retracted position and adapted to lift the rear end of the panel in an arcuate path away from the tracks and into positively closed position when the panel is moved to its forward position.

2. In the combination as defined in claim 1, yieldable means tending to rotate the projection receiving members away from alining position, and releasable means for holding said members in alined position.

3. In the combination as defined in claim 1, yieldable means tending to rotate the projection receiving members away from alining position, releasable means for holding said members in alined position including means engaged by one of said projections upon entering the projection receiving members to trip the releasable means and permit said members to swing upwardly.

4. In automobile top construction, the combination of a roof having an opening therein, a panel for closing the opening having laterally projecting trunnions adjacent its forward and rear edges, tracks mounted along the sides of the opening for receiving the forward trunnions, tracks mounted to the rear of the first-named tracks for receiving the rearward trunnions, pivoted trunnion receiving members adjacent the forward ends of the rear tracks and adapted to receive the rear trunnions toward the end of their forward movement and guide them away from the tracks in a forwardly and upwardly movement so as to bring the panel into position positively closing the opening.

5. In automobile top construction, the combination of a roof having an opening therein, a panel for closing the opening having laterally projecting trunnions adjacent its forward and rear edges, tracks mounted along the side of the opening for receiving the forward trunnions, tracks mounted to the rear of the first-named tracks for receiving the rearward trunnions, pivoted members adjacent the forward ends of the rear tracks and adapted to receive the rear trunnions toward the end of their forward movement and guide them in a forwardly and upwardly movement so as to bring the panel into position closing the opening, and yielding means tending to urge said pivoted members in a forwardly direction.

6. In automobile top construction, the combination of a roof having an opening therein, a panel for closing the opening having laterally projecting trunnions adjacent its forward and rear edges, tracks for receiving the forward trunnions mounted along the sides of the opening, tracks receiving the rearward trunnions mounted to the rear of the first-named tracks, pivoted members adjacent the forward ends of the rear tracks and adapted to receive the rear trunnions toward the end of their forward movement and guide them in a forwardly and upwardly movement so as to bring the panel into position closing the opening, and means for releasably holding said pivoted members in position in alinement with said tracks.

7. In automobile top construction, the combination of a roof having an opening therein, a panel for closing the opening, laterally projecting trunnions adjacent the forward and rear edges of said panel, tracks mounted along the sides of the opening for receiving the forward trunnions, tracks mounted to the rear of the first-named tracks for receiving the rearward trunnions, pivoted members adjacent the forward ends of the rear tracks and adapted to receive the rear trunnions toward the end of their forward movement and guide them in a forwardly and upwardly movement so as to bring the panel into position closing the opening, means for drawing said panel into closed position embodying mechanical advantage so as to reduce the force required to raise said panel by means of said pivoted members.

8. In automobile top construction, the combination of a roof having an opening therein, a panel for closing the opening having laterally projecting trunnions adjacent its forward and rear edges, tracks for receiving the forward trunnions mounted along the sides of the opening, tracks receiving the rearward panels mounted to the rear of the first-named tracks, pivoted members adjacent the forward ends of the rear tracks and adapted to receive the rear trunnions toward the end of their forward movement and guide them in a forwardly and upwardly movement so as to bring the panel into position closing the opening, yielding means tending to urge said pivoted members in a forwardly direction, and releasable means for holding said pivoted members in alinement with said track adapted to be released by entrance of the rear trunnions into said members.

9. In an automobile body the combination of a roof having a wedge-shaped opening therein, a wedge-shaped panel adapted to close said opening, means movably to support said panel, and means to draw the panel into wedging engagement with said opening.

10. In an automobile body, the combination of a roof having a wedge-shaped opening therein, a wedge-shaped panel movable to close said opening or to expose it, a compressible material secured at the edge of the opening, means movably to support the panel, and means to draw the panel into wedging engagement with the opening and simultaneously to compress the material and make a weather-tight joint.

11. In an automobile body, the combination of a roof having a solid part and a wedge-shaped opening, a wedge-shaped panel movable from under the solid part to close said opening, a compressible material secured at the edge of the opening, means movably to support the panel to enable it to be shifted to and from the opening, and means to draw the panel into wedging engagement with the opening and simultaneously to compress the material and make a weather-tight joint.

EMORY GLENN SIMPSON.